(12) United States Patent
Fieschi et al.

(10) Patent No.: US 7,177,849 B2
(45) Date of Patent: Feb. 13, 2007

(54) METHOD FOR VALIDATING AN ELECTRONIC PAYMENT BY A CREDIT/DEBIT CARD

(75) Inventors: Jacques Fieschi, St Laurent du Var (FR); Jean-Francois Le Pennec, Nice (FR); Patrick Michel, La Gaude (FR); Pascal Roy, Biot (FR)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 09/810,286

(22) Filed: Mar. 16, 2001

(65) Prior Publication Data

US 2002/0007352 A1    Jan. 17, 2002

(30) Foreign Application Priority Data

Jul. 13, 2000    (EP)    ................... 00480058

(51) Int. Cl.
*G06Q 99/00*    (2006.01)
(52) U.S. Cl. ................ 705/72; 705/64; 705/75; 705/77; 705/78; 713/150
(58) Field of Classification Search ........... 705/50–80, 705/26, 1, 39–44; 713/155
See application file for complete search history.

(56) References Cited

U.S. PATENT DOCUMENTS 4,837,422 A    6/1989   Dethloff et al. ............ 235/380
5,285,055 A    2/1994   Oonakahara et al. ....... 235/380
5,914,472 A *  6/1999   Foladare et al. ............ 235/380
5,953,710 A *  9/1999   Fleming ...................... 705/38

(Continued)

FOREIGN PATENT DOCUMENTS

EP    2769736    4/1999

(Continued)

OTHER PUBLICATIONS

U.S. Appl. No. 60/181,225.*

(Continued)

*Primary Examiner*—Jalatee Worjloh
(74) *Attorney, Agent, or Firm*—John Pivnichny; Greenblum & Bernstein, PLC

(57) ABSTRACT

Method for validating an electronic payment by a credit card in a transaction system comprising a seller terminal (12) for registering a sale of one or several articles by a buyer (10 or 11) using a credit card associated with a plurality of PIN codes and an electronic payment center (14) connected to the seller terminal by the Internet network (16). The method consists for the electronic payment center to check that a buyer PIN code which is provided by the buyer to the center is associated with the number of the credit card provided by the buyer to the seller terminal and is characterized in that it comprises a step automatically carried out by the electronic payment center of checking with a third party whether the buyer PIN code is valid.

17 Claims, 2 Drawing Sheets

U.S. PATENT DOCUMENTS

| | | | | |
|---|---|---|---|---|
| 5,963,926 | A | * | 10/1999 | Kumomura ................... 705/41 |
| 5,999,596 | A | * | 12/1999 | Walker et al. ........... 379/91.01 |
| 5,999,624 | A | * | 12/1999 | Hopkins ....................... 705/70 |
| 6,014,650 | A | * | 1/2000 | Zampese ..................... 705/44 |
| 6,098,053 | A | * | 8/2000 | Slater .......................... 705/44 |
| 6,205,437 | B1 | * | 3/2001 | Gifford ....................... 705/75 |
| 6,213,391 | B1 | * | 4/2001 | Lewis ........................ 235/380 |
| 6,327,578 | B1 | * | 12/2001 | Linehan ...................... 705/65 |
| 6,748,367 | B1 | * | 6/2004 | Lee .............................. 705/66 |
| 6,853,987 | B1 | * | 2/2005 | Cook ........................... 705/75 |
| 2001/0039535 | A1 | * | 11/2001 | Tsiounis et al. .............. 705/71 |
| 2002/0077837 | A1 | * | 6/2002 | Krueger et al. ................ 705/1 |

FOREIGN PATENT DOCUMENTS

| | | |
|---|---|---|
| GB | 2289783 | 11/1995 |
| KR | 2000-36972 | 7/2000 |
| WO | 9945693 | 9/1999 |

OTHER PUBLICATIONS

Meyer et al., "Some Cryptographic Principles of Authentication in Electornic Funds Transfer Systems", 1981, IEEE.*

* cited by examiner

METHOD FOR VALIDATING AN ELECTRONIC PAYMENT BY A CREDIT/DEBIT CARD

TECHNICAL FIELD

The present invention relates generally to the methods and systems for enhancing the security of the electronic transactions using a credit or debit card and relates in particular to a method for validating an electronic payment by a credit/debit card.

BACKGROUND

The electronic payment is more and more used to perform transactions, in particular through the Internet network. In such a case, a seller provides an electronic catalog for selling articles or even services through Internet. Any buyer connected by a terminal to Internet can consult the catalog and purchase the proposed articles by sending his order to the seller through Internet together with his credit/debit card number (herein after referred to as "card number").

Generally, the payment is validated by using an electronic payment center which is also connected to the Internet network. Such a center is connected to the banking companies and authorized/certified by these banking companies. At the same time the buyer orders the articles to the seller, he transmits his PIN (Personal Identification Number) code to the electronic payment center together with the identification of the purchased articles, the date and the time of the purchase. Upon receiving the order, the seller sends the identification of the articles, the time and date and the card number to the electronic payment center which can then validate the payment after checking that the PIN code number corresponds to the card number.

But, in such an electronic payment, it is always the buyer who decides and validates the transaction. Now, considering the increase of electronic payment through the Internet network, and considering the need that such a system may be available to several people depending upon a single credit like to young people (children) or old people (grandparents) who are sometimes overtaken by the today techniques, it is a problem not having such a transaction being validated by the prime owner of the credit card, or in a general way by a third party.

SUMMARY OF THE INVENTION

Accordingly, the main object of the invention is to achieve a method for validating by a third party an electronic payment using a credit/debit card.

The invention relates therefore to a method for validating an electronic payment by a credit/debit card in a transaction system comprising a seller terminal for registering a sale of one or several articles by a buyer using a card associated with a plurality of PIN codes and an electronic payment center connected to the seller terminal by the Internet network, the method consisting for the electronic payment center to check that a buyer PIN code which is provided by the buyer to the center is associated with the number of the credit/debit card provided by the buyer to the seller terminal. Such a method is characterized in that it further comprises the step automatically carried out by the electronic payment center of checking with a third party whether the buyer PIN code is valid.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
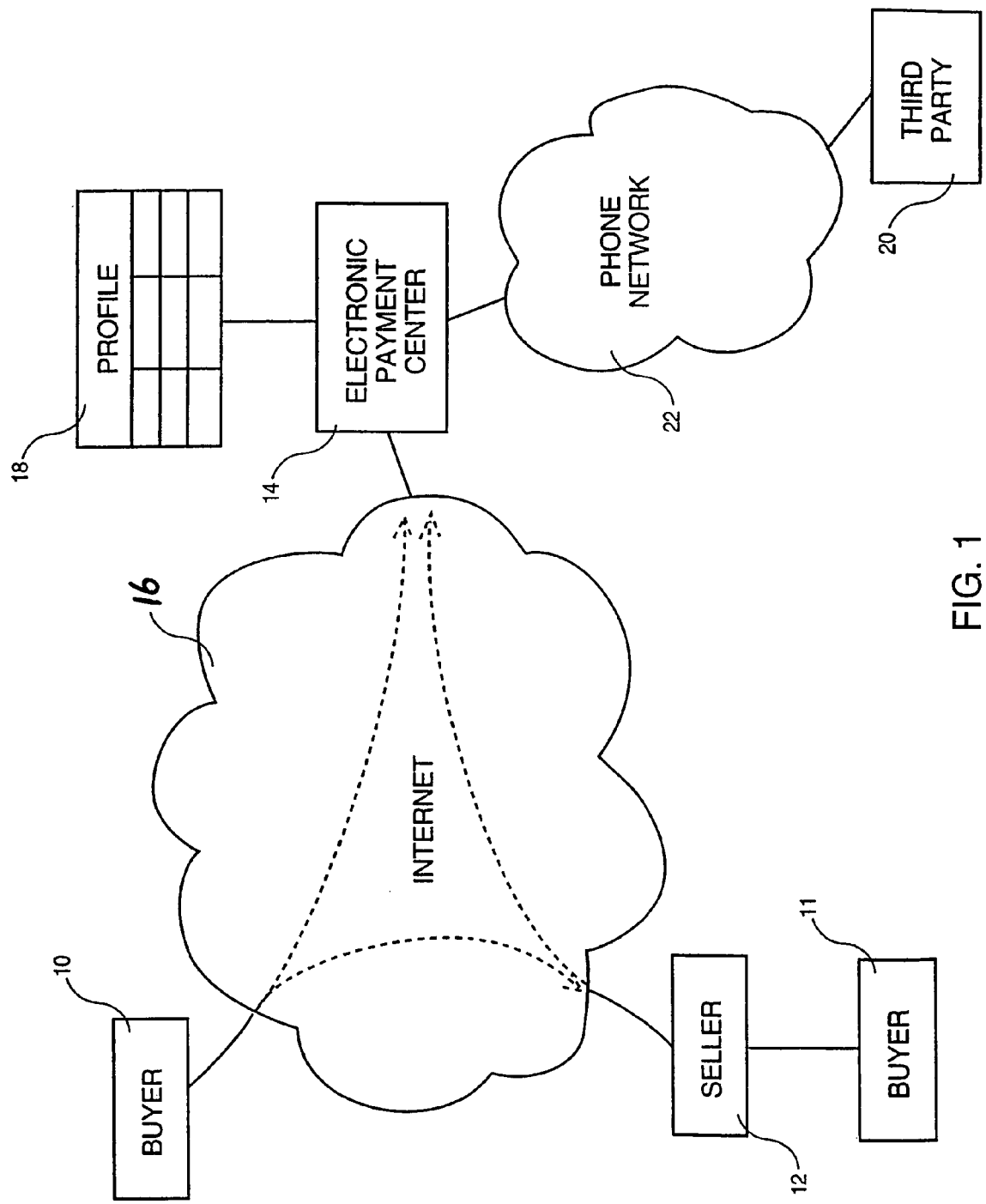
FIG. 1 is a block-diagram of a system wherein a buyer orders articles to a seller and performs the payment to an electronic payment center through the Internet network.

According to the invention, a buyer terminal 10, a seller terminal 12 and an electronic payment center 14 are all connected to the Internet network 16. When the buyer wants to order articles after having consulted an electronic catalog, he sends the order through the network to the seller terminal 12. For this, he sends with an encryption key 1 provided by the seller at the initialization of the transaction, the necessary information that is the credit/debit card number, the identification of the ordered articles and the time and date of the purchase. At the same time, the buyer sends through Internet another message which is encrypted by an encryption key 2 to the electronic payment center 14, this message containing the identification of the purchased articles, and the time and date of the purchase. After receiving the purchase order, the seller terminal 12 sends with an encryption key 3 the information necessary to achieve the electronic payment, that is the identification of the articles and the time and date of the purchase, and also a PIN code number. Note that encryption key 2 and 3 have been previously provided by the electronic payment center to respectively the buyer 10 and the seller 12.

It must be noted that generally the buyer 10 is remote from the seller and the transaction between them is made through Internet. But it is possible that a buyer 11 be in the seller shop. In such a case, the necessary information is directly provided by the buyer and the information containing the PIN code is transmitted from the terminal seller 12 to the electronic payment center.

After receiving the PIN code number from the buyer 10, the electronic payment center checks whether the PIN code number being received is a valid PIN code by checking in profile tables 18 the entries of which are the card numbers and giving some other information for each PIN code such as the authorized amount. If so, the electronic payment center 16 launches a validation process by contacting a third party 20 through a phone network 22. It must be noted that such a phone network is preferably a wireless phone network wherein the third party 20 is the owner of a mobile phone because the third party can be always contacted (assuming his mobile phone is always activated) . Note also that the phone network could be replaced by any kind of transmission network, and in particular, the Internet network.

Figure 2:
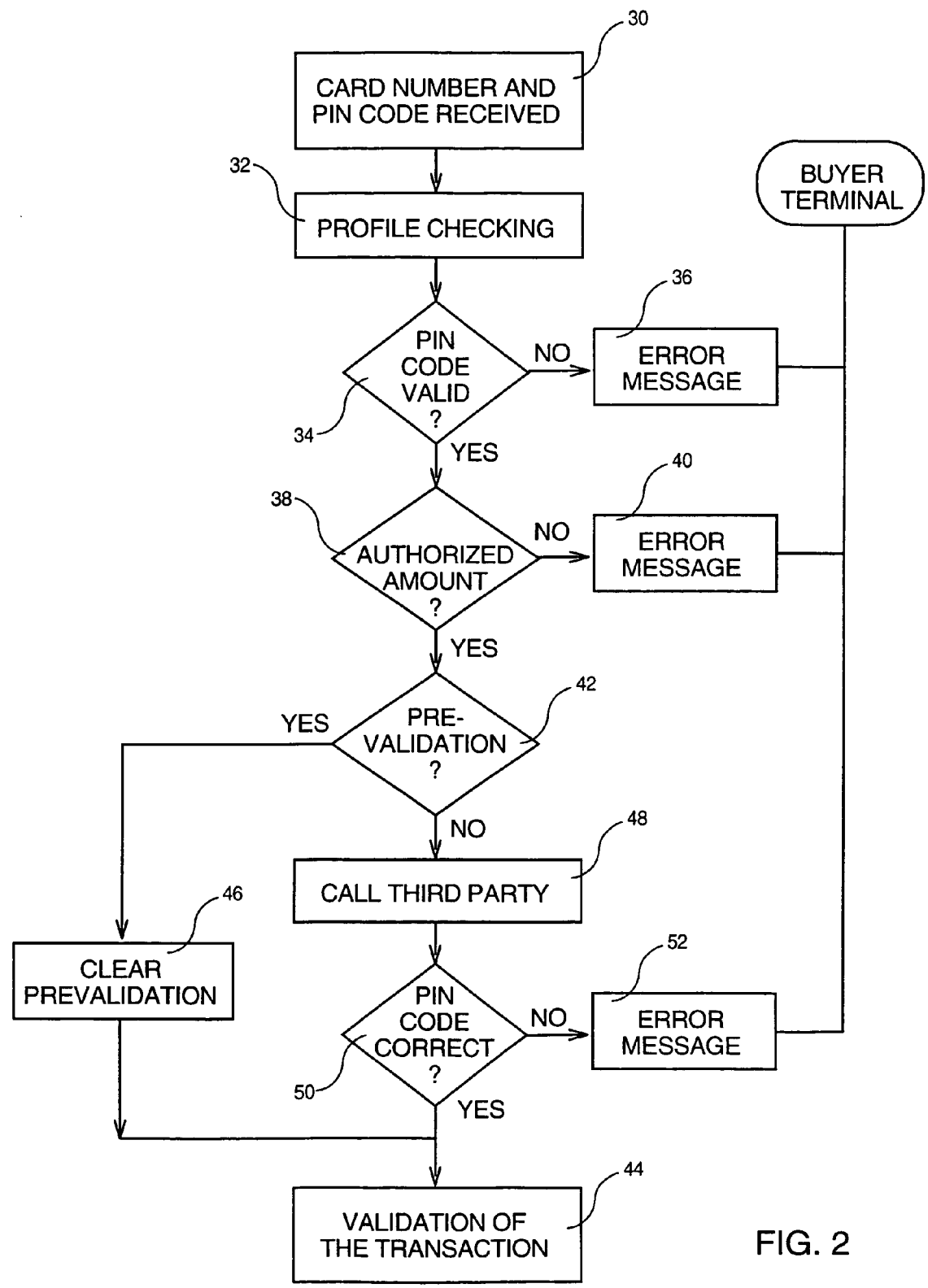
FIG. 2 is a flow chart of the steps performed in the electronic payment center in order to achieve the method according to the invention.

The steps of the method according to the invention, performed in the electronic payment center are now described in reference to the flow chart of FIG. 2. As already mentioned, the card number and the PIN code of the buyer are first received (step 30) by the electronic payment center from respectively the buyer and the seller. After receiving this information, the computer of the electronic payment center performs a profile checking (step 32) by consulting a profile table (see FIG. 1). In fact, there are different PIN codes corresponding to the card number which can, for example, be derived from the original PIN code by some algorithm like a scrambling algorithm. Thus, the prime owner of the card may give to other people a copy of the card (for example, a man can give one copy to his wife and one copy to each of his children). All these people have different PIN codes and so, they will be differently identified during a payment transaction.

Coming back to FIG. 2, the profile tables enable the validating party to know whether the PIN code provided by the buyer is valid (step 34). If not, an electronic error message is sent to the buyer terminal (step 36). If the PIN code corresponds to one of the valid codes associated with the card, the computer of the electronic payment center can check additional information within the profile tables, for example, the maximum amount authorized for this PIN code and whether the price of the purchased articles is less than the maximum amount (step 38). If not, an electronic error message is sent to the buyer terminal (step 40).

When the requested amount is below the authorized maximum, the computer of the electronic payment center checks whether it has received in a previous interval of time (for example one hour) a prevalidation from the third party including the delivery of the PIN code (step 42). It must be noted that this prevalidation can occur at any time and also canceled at any time by the third party calling the computer of the electronic payment center and through interactive dialog using a phone keyboard.

When such a prevalidation has been received, the computer of the electronic payment center validates the transaction (step 44) after having cleared (step 46) the prevalidation information (so, it is no more valid for a potential next transaction). When there is no prevalidation, the computer calls the third party (step 48) and through artificial voice, asks for the authorized PIN code to determine whether the PIN code provided by the buyer is a correct PIN code (step 50). If so, the transaction is validated (step 44). If the PIN code provided by the third party does not correspond to the PIN code provided by the buyer, an electronic error message is sent to the buyer terminal (step 52).

The invention claimed is:

1. A method for validating an electronic payment by a credit/debit card in a transaction system, comprising:
    registering a purchase of at least one article by a buyer using a credit/debit card associated with at least one PIN code at a seller terminal connected to an electronic payment center by a communication network;
    checking, by the electronic payment center, that the at least one PIN code which is provided by said buyer to said electronic payment center is associated with the number of said credit/debit card provided by said buyer to said seller terminal;
    checking, by said electronic payment center, whether or not said at least one PIN code is valid;
    checking by said electronic payment center whether the amount of said purchase of the at least one article is below a maximum amount authorized for the at least one PIN code, each PIN code authorizing a different maximum amount; and
    one of:
        checking, by said electronic payment center, whether the electronic payment center has received a prevalidation from a third party;
        contacting a third party via a communication network and requesting that the third party validate the purchase, and
        contacting a third party via a communication network and requesting said at least one PIN code from the third party,
    wherein the third party is a prime owner of the credit/debit card,
    wherein the credit/debit card number and the at least one PIN code which have been provided to said seller terminal by said buyer are transmitted to said electronic payment center to check whether the at least one PIN code is associated with said credit/debit card number, and
    wherein said electronic payment center checks in at least one profile table whether said PIN code is associated with the credit/debit card number.

2. The method according to claim 1, wherein said buyer has a terminal which is connected to the communication network and said terminal is configured to transmit the number of the credit/debit card.

3. The method according to claim 1, further comprising the step of checking by said electronic payment center whether or not there is a prevalidation of the purchase of the at least one article by said buyer.

4. The method according to claim 3, wherein said prevalidation of the purchase of the at least one article by said buyer is cleared after it has been used.

5. A method for validating an electronic payment, comprising the steps of:
    providing, from a buyer to a seller in order to conclude a sale, a credit/debit card number;
    receiving transaction information from a buyer and a seller by an electronic payment center;
    performing a first validation with the transaction information from the buyer and the seller by the electronic payment center;
    requesting, by the electronic payment center, further validation from a third party to provide authentication by an electronic transaction; and
    processing the sale by an electronic transaction upon authentication by the first validation and the further validation,
    wherein the requesting comprises one of:
        contacting the third party via a communication network and requesting that the third party validate the sale; and
        contacting the third party via a communication network and requesting the buyer PIN code from the third party, and
    wherein the third party is a prime owner of the credit/debit card.

6. The method of claim 5, wherein:
    the transaction information sent by the buyer is at least one of article information, date and time of purchase, the buyer PIN code, and the credit/debit card number, and
    the transaction information sent by the seller is at least one of article information, date and time of purchase, and the buyer PIN code.

7. The method of claim 6, wherein the article information includes purchase price.

8. The method of claim 5, further comprising the seller receiving the credit/debit card number, an article identification, a transaction time, a transaction date, and the buyer PIN code from the buyer.

9. The method of claim 5, further comprising the electronic payment center comparing at least one portion of the transaction information with profile table information.

10. The method of claim 9, wherein the profile table information comprises at least one of the credit/debit card number, the buyer PIN code, and an authorization amount corresponding to the buyer PIN code.

11. The method of claim 9, wherein the electronic payment center clears the at least one portion of transaction information from the third party.

12. The method of claim 5, further comprising sending an error message to the buyer if a purchase amount is outside an authorized limit of the credit/debit card.

13. A method for electronic sales, comprising:
receiving transaction information from a buyer and a seller by an electronic payment center;
performing a pre-validation of buyer information with a third party;
performing a validation with the transaction information from the buyer and the seller by the electronic payment center using a credit/debit card number and a PIN code provided by the buyer; and
providing authentication for a sale by an electronic transaction when the pre-validation and validation provide authorization,
wherein the third party is a prime owner of the credit/debit card.

14. The method of claim 13, further comprising determining, by the electronic payment center, whether an amount charged to the credit card number is within an authorized limit, if the PIN code of the transaction information is verified.

15. The method of claim 14, further comprising checking for pre-validation of the PIN code when the amount charged to the credit card number is within an authorized amount.

16. The method of claim 15, further comprising sending an error message to the buyer if the amount is outside an authorized limit.

17. The method of claim 13, wherein the third party is a living human being and wherein the performing a pre-validation of buyer information with a third party occurs by checking, by said electronic payment center, whether the electronic payment center has received a pre-validation from the third party, wherein the providing authentication for a sale by an electronic transaction when the pre-validation and validation provide authorization occurs after pre-validation and between the electronic payment center and the seller, and wherein the third party is a person other than the buyer.

* * * * *